J. S. GISBORNE.
APPARATUS FOR TRANSMITTING AND RECEIVING SIGNALS, &c.
No. 184,774. Patented Nov. 28, 1876.
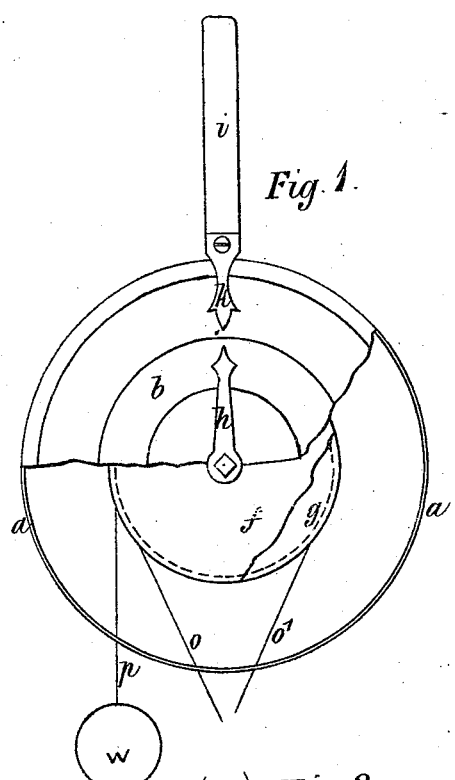
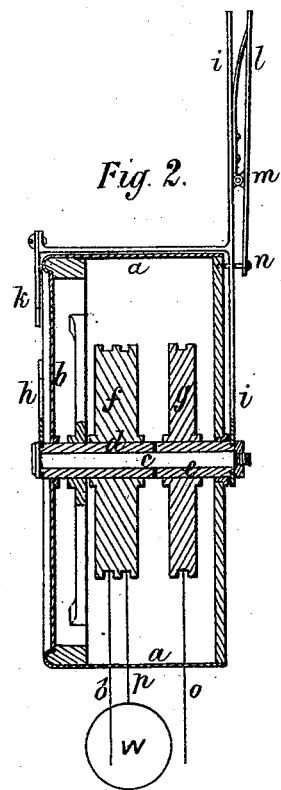
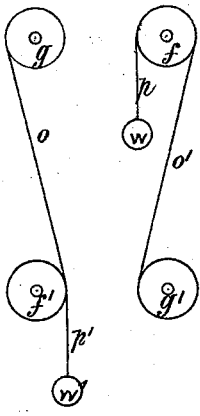
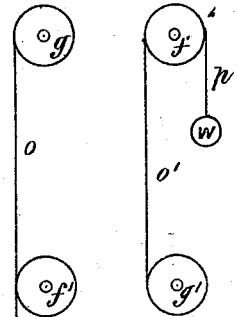
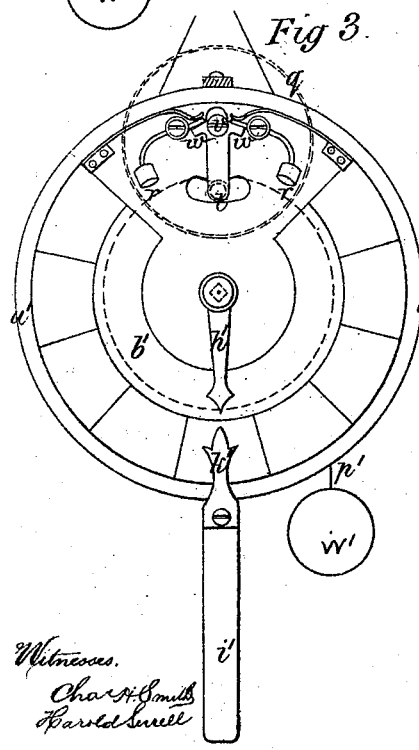
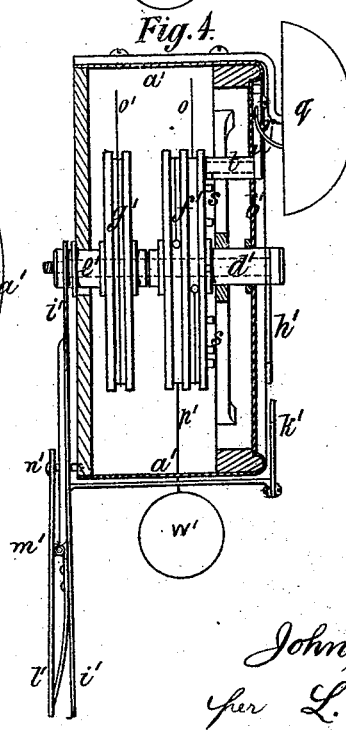
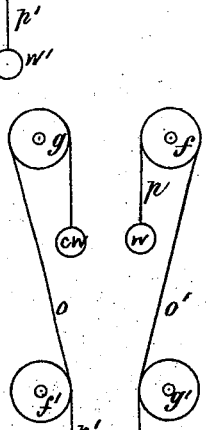
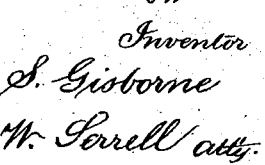
Inventor
John S. Gisborne
per L. W. Sorrell atty.

UNITED STATES PATENT OFFICE.

JOHN SACHEVERELL GISBORNE, OF BUCKINGHAM STREET, LONDON, ENGLAND.

IMPROVEMENT IN APPARATUS FOR TRANSMITTING AND RECEIVING SIGNALS, &c.

Specification forming part of Letters Patent No. 184,774, dated November 28, 1876; application filed September 27, 1876.

*To all whom it may concern:*

Be it known that I, JOHN SACHEVERELL GISBORNE, of Buckingham Street, London, in the county of Middlesex and Kingdom of England, electrical engineer, have invented Improvements in Apparatus for Transmitting and Receiving Signals and Orders or Messages, of which the following is a specification:

This invention has for its object the cheapening and simplifying the construction of mechanical telegraphs intended more particularly for use on board steam and sailing ships for transmitting orders from the "bridge" to the engine-room or to the steersman, and for enabling the order so transmitted to be repeated on the transmitting instrument, the said improved apparatus being also applicable for use in mines, buildings, and other places; also on board men-of-war and in forts for transmitting and repeating the orders required for working the guns.

According to my invention I transmit the desired order from the transmitter or sending instrument to the indicator or receiving instrument (which instruments may be situate at any distance apart and in any desired relative positions) by a single flexible connector, in combination with a weight or spring, the said connector being attached at one end to the periphery of a wheel or quadrant contained inside the casing of the transmitter, while its opposite end is attached to the periphery of another wheel or quadrant contained inside the indicator. The repeating on the dial of the transmitter of the order which has been given is also effected by a single flexible connector and weight or spring, which connector is, in case of a steering-telegraph, attached so a wheel or quadrant mounted on the rudder-post, or otherwise caused to turn by the motion of the rudder, so that the rudder itself acts as a tell-tale by indicating its position on the dial of the transmitter. The connector which I prefer to employ consists of pieces of chain of sufficient length to allow for the requisite amount of travel round the different pulleys or quadrants and guide-pulleys, with intermediate lengths of straight rods or wires attached thereto. The same arrangement may be used on railways for giving a reply back from the distant signal to the signal-box.

Figure 1 of my drawings represents a front elevation of the head of the transmitter or sending instrument, a portion of the dial being represented as broken away, in order to show the internal pulleys or quadrants. Fig. 2 is a corresponding vertical section of the same, taken at right angles thereto. This instrument is to be under the control of the person who transmits the orders, and in the case of a ship might be mounted on the bridge. Fig. 3 is a front elevation of the indicator or receiving instrument, and Fig. 4 is a corresponding vertical section of the same, taken at right angles thereto. This instrument is to be situate in convenient proximity to the person for whom the orders are intended—for example, on board ship it would be placed in the engine-room, or in front of the steersman, as the case may be, so that any order sent by the transmitter may be readily observed on the dial of the indicator, and the same order repeated back to the dial of the transmitter.

$a$ is the casing or head of the transmitter, which may be mounted on a hollow pedestal or stand of convenient height for the hand of the operator. $b$ is a dial, bearing on its face the various orders to be sent. $c$ is a central spindle or bolt, which carries two separate and independent tubular spindles, $d$ and $e$, turning freely thereon. The tubular spindle $d$ has fast thereon a double or single grooved pulley or quadrant $f$, while the tubular spindle $e$ carries, in like manner, a single grooved pulley or quadrant, $g$.

On the squared outer end of the tubular spindle $d$ there is mounted the pointer $h$, and on the squared outer end of the tubular spindle $e$ there is similarly mounted the actuating lever-handle $i$, to which is connected, outside the casing, the pointer $k$. A spring-lever, $l$, is hinged at $m$ to the back of the actuating-handle, and carries at its lower end a pin, $n$, which, when the spring-lever is released, enters one or other of a series of holes or notches made in the back of the casing, there being a hole or notch to correspond to each order on the dial.

The indicator or receiving instrument, Figs. 3 and 4, is of a similar construction to the transmitter or sending instrument, the parts which correspond to those in the transmitter being marked with the same letters of reference accented. In Fig. 3 the dial is shown as facing in the same direction as the dial of the transmitter above, but in Fig. 4 I have shown the dial of the indicator as facing in the opposite direction to that of the corresponding transmitter. To the periphery of the pulley $g$ in the transmitter there is attached one end of the flexible connector $o$, which passes partly round the said pulley, while the opposite end of this connector is attached to and passes partly round one of the grooves of the double-grooved pulley $f'$ in the indicator. The arrangement of the transmitting and repeating connectors and their weights or springs will be more clearly understood on referring to the diagrams (drawn to a smaller scale) at Figs. 5 and 6, which represent, respectively, the arrangement of transmitting and repeating connectors when the dials of both instruments look the same way or correspond to Figs. 1 and 3. The weight $W'$ is suspended by a cord or chain, $p'$, which is attached to and passes partly round the second groove of the double-grooved pulley $f'$, and hangs from the same side of the said pulley as that on which the connector $o$ enters it from the transmitter.

The repeating-connector $o'$, Fig. 6, which is employed for repeating on the dial of the transmitter the order transmitted, is attached to and passes partly around the pulley $g'$ in the indicator at one end, while its other end is attached to, and passes partly around, one of the grooves of the double-grooved pulley $f$ in the transmitter. A weight, W, or a spring, is suspended from, or attached to, the periphery of the second groove in the said pulley $f$, the said weight being suspended by a cord or chain, $p$, from the opposite side of the periphery of the pulley to that on which the repeating-connector $o'$ enters from the indicator.

When the dials of the two instruments look in opposite directions, as in Figs. 2 and 4, then the arrangement of the connectors $o$ $o'$, with their weights or springs W W', will be as shown in the diagrams, Figs. 7 and 8. When using a single in lieu of a double grooved pulley, the connector is pinned to both the pulleys, and the weight or spring attached to the free ends of the connector itself.

The action of my improved mechanical telegraph is as follows: On transmitting an order the spring-lever $l$ is first grasped so as to withdraw the stop-pin $n$ and release the actuating-lever handle $l$, which is then free to be moved either to the right or left, so as to bring its pointer $k$ opposite to the order to be transmitted. This movement of the handle imparts a corresponding movement to the tubular spindle $e$ and pulley $g$, which is transmitted to the pulley $f'$ in the indicator by the single flexible connector $o$. If the handle be moved in one direction the said connector will be more or less wound around the periphery of the pulley $g$, and will, by turning the pulley $f'$ in the indicator, wind up the weight $W'$. Should the handle of the transmitter be moved in the opposite direction, it will allow the pulley $f'$ in the indicator to be turned in the reverse direction by the action of the weight or spring $W'$, and as the pointer $h'$ in the indicator is fast on the tubular spindle $d'$, which carries the pulley $f'$, the said pointer will in either case move in concert with the handle of the transmitter, and will, consequently, indicate the corresponding order on the dial of the indicator. On arriving at the order required, the pointer $k$ of the transmitter will be held in that position by releasing the spring-lever $l$, which will cause the stop-pin $n$ to enter the corresponding hole or notch in the back of the instrument.

The order thus transmitted is replied to by being repeated on the dial of the transmitter, by moving the actuating-handle $i'$ of the indicator or receiving-instrument, Figs. 3 and 4, so as to bring its pointer $k'$ to the order received, thereby turning the pulley $g'$, and, through the action of the single connector $o'$ or of the weight or spring W, as the case may be, on the pulley $f$, moving the pointer $h$ of the transmitter around to the corresponding order on its dial, thus showing that the order has been received and understood.

It will be obvious that, according to the arrangement of connector and weight or spring, hereinbefore described, the weight or spring will, in some cases, be the actual prime mover, and will, in fact, tend to draw the actuating-handle $i$ or $i'$ of the instrument over in one direction when released; hence the necessity for the stop-pin $n$ and holes or notches, to maintain the said handle in position. On the other hand, when the actuating-handle is moved in the reverse direction, the gravity of the weight or the power of the spring will have to be overcome. Should any inconvenience arise from this action of the weights or springs, the arrangement shown in the diagrams Figs. 9 and 10 may be adopted.

According to this arrangement I attach a counter-weight or counter-spring, C W, to one side of the pulley $g$ in the transmitter, and another counter-weight or counter-spring, C' W', to one side of the pulley $g'$ in the indicator, in such a manner that the said counter weights or springs shall neutralize the action of the weights or springs W and W', already referred to, and enable the actuating-handle $i$ $i'$ of either instrument to remain at rest in any position without the necessity for a stop-pin or other retaining-catch.

If desired, a striking-gong may be combined with the indicator, as shown in Figs. 3 and 4, for the purpose of calling the attention of the person for whom the order is intended. The gong $q$ may be attached to any convenient part of the indicator, and be struck by one or other of the two hammers $r$ $r$ as the pointer $h'$ passes around in either direction from one order to another on the dial of the transmitter. This may be accomplished by having a number of studs or pins, $s$, in the side of the pulley $f'$ of the indicator, the number of such studs or pins corresponding to the number of orders on the dial, so that each pin, as it passes around shall come in contact with an anti-friction roller, $t$, on the lower end of a spring-lever, $u$. This lever works on a fixed center at $v$, and is provided with a projecting arm, $w$, on each side, for the purpose of raising the stem of one or other of the spring-hammers $r$, and suddenly releasing it, so as to cause either of the hammers to strike the gong as each pin deflects and releases the spring-lever $u$ in either direction.

Although I have described and illustrated a mode of working a gong in connection with my peculiar single flexible connector-telegraph and repeating instrument, I wish it to be understood that I do not claim such gong arrangement as constituting any part of my said invention.

It is obvious that in lieu of using a circular dial and revolving pointer either in the transmitter or in the indicator, a straight indicating-tablet may be used having the requisite orders marked thereon, the pointer or indicator being caused to travel longitudinally along such tablet from one order to another by a single flexible connector. This connector is attached, at one end, to the actuating-handle of the transmitter, while its opposite end is attached to the pointer of the indicator-tablet, a weight or spring being so connected to the said pointer as to cause it to travel in one direction by the action of the said weight or spring, or, if preferred, counter-weights or counter-springs may be combined with the before-mentioned weights or springs, so as to neutralize their action, and enable the handle of the transmitter or of the indicator to remain at any given order without the necessity for stops or catches, as before explained.

In applying my single flexible-connector arrangement to what is known as a rudder "tell-tale," it is simply requisite to attach one end of the single flexible connector to a wheel or quadrant mounted directly on the rudder-post itself, or caused to turn by intermediate gear from the rudder-post, the opposite end of the said connector being attached to the pulley $f$ of the steering-transmitter, so that the rudder itself will always indicate its position on the dial of that instrument, which is marked with the usual steering-orders as well as with degrees. The dial of the steering-indicator, by which the steering-orders are indicated to the steersman, is also marked with the same orders and degrees. I sometimes propose to employ a single flexible connector as an engine tell-tale for indicating on the bridge, or elsewhere on a separate dial or tablet, the direction of rotation, as well as the number of revolutions of the engine-shaft, so that the order, having been transmitted to the engineer and repeated by him by the apparatus hereinbefore described, a further check will be obtained by causing the engine itself to indicate on the separate dial or tablet the direction and speed of working. This I accomplish by a single flexible connector, which passes over, or partly round, a pulley or quadrant carrying the pointer of the said indicating-instrument, and has both its ends attached to springs, which act in opposite directions. An eccentric or tappet is fitted on the engine-shaft in close proximity to the said flexible connector, and so arranged that at every revolution of the engine-shaft the said eccentric or tappet will cause the connector to be suddenly pulled and released again, the result being that the pointer on the corresponding dial or tablet will be deflected in one direction or the other, according as the engines are going ahead or astern, and will make such deflection at each revolution. By connecting the pointer either directly or indirectly to any well-known arrangement of engine-counter, it is obvious that the number of revolutions may be registered.

I am aware that it has been already proposed to work mechanical telegraphs with double or endless flexible connectors passing round the pulleys of the transmitter and indicator in the form of an endless band or double connectors, such an arrangement necessitating not only the use of an unnecessary length of connector, but also an increased number of intermediate guide-pulleys for the proper guiding of the said double connectors; and, therefore, I lay no claim to the use of flexible connectors generally in the class of mechanical telegraphs herein referred to; neither do I claim, generally, the use of a single flexible connector for transmitting motion from an actuating-lever to a signaling apparatus, as I am aware that such an arrangement has long been known and used as applied to railway-signals; but What I consider to be novel and original, and, therefore, claim as my invention, is—

1. The combination, with an indicating-dial and transmitting-wheel or segment, $g$, and connector $o$, of the repeating-connector $o'$, wheel or segment $f$, and pointer, substantially as set forth.

2. The transmitting mechanism, substantially as specified, for giving a distant signal, in combination with the repeating mechanism, substantially as set forth, to indicate at the transmitting end the reception of the message, substantially as specified.

In witness whereof I have signed my name in the presence of two subscribing witnesses.

JOHN SACHEVERELL GISBORNE.

Witnesses:
EDWIN P. ALEXANDER,
  14 *Southampton Buildings, London.*
A. E. ALEXANDER,
  14 *Southampton Buildings, London.*